(12) United States Patent
Ganti et al.

(10) Patent No.: US 9,124,354 B2
(45) Date of Patent: Sep. 1, 2015

(54) ISOLATION AND PROTECTION CIRCUIT FOR A RECEIVER IN A WIRELESS COMMUNICATION DEVICE

(75) Inventors: Ramkishore Ganti, Bangalore (IN); Sanjeev Ranganathan, Bangalore (IN); Srinath Sridharan, Bangalore (IN)

(73) Assignee: ST-ERICSSON SA, Plan-les-Ouates (CH)

(*) Notice: Subject to any disclaimer, the term of this patent is extended or adjusted under 35 U.S.C. 154(b) by 69 days.

(21) Appl. No.: 13/441,327

(22) Filed: Apr. 6, 2012

(65) Prior Publication Data

US 2012/0287969 A1 Nov. 15, 2012

Related U.S. Application Data

(60) Provisional application No. 61/485,458, filed on May 12, 2011.

(51) Int. Cl.
| | | |
|---|---|---|
| H02H 9/00 | (2006.01) |
| H02H 3/20 | (2006.01) |
| H02H 9/04 | (2006.01) |
| H02H 3/22 | (2006.01) |
| H04B 1/48 | (2006.01) |
| H04B 1/525 | (2015.01) |

(52) U.S. Cl.
CPC . *H04B 1/48* (2013.01); *H04B 1/525* (2013.01)

(58) Field of Classification Search
CPC ........... H02H 9/046; H04B 1/48; H04B 1/525
USPC ....... 361/56, 91.1, 111, 117; 455/83
See application file for complete search history.

(56) References Cited

U.S. PATENT DOCUMENTS

| | | | | |
|---|---|---|---|---|
| 5,576,920 A | * | 11/1996 | Kosuga et al. | 361/56 |
| 5,603,324 A | | 2/1997 | Oppelt et al. | |
| 5,768,690 A | * | 6/1998 | Yamada et al. | 455/78 |
| 5,923,647 A | * | 7/1999 | Dolman et al. | 370/280 |
| 6,356,536 B1 | * | 3/2002 | Repke | 370/282 |
| 7,283,793 B1 | * | 10/2007 | McKay | 455/83 |
| 7,756,486 B1 | * | 7/2010 | Tan et al. | 455/73 |
| 7,890,063 B2 | | 2/2011 | Ahn et al. | |
| 7,978,448 B2 | * | 7/2011 | Chee et al. | 361/56 |
| 7,985,644 B1 | * | 7/2011 | Boyd et al. | 438/238 |
| 8,050,634 B2 | * | 11/2011 | Olsson et al. | 455/78 |
| 8,218,277 B2 | * | 7/2012 | Li et al. | 361/56 |
| 8,442,451 B1 | * | 5/2013 | Tan et al. | 455/73 |
| 8,582,258 B1 | * | 11/2013 | Luo et al. | 361/56 |

(Continued)

FOREIGN PATENT DOCUMENTS

| | | |
|---|---|---|
| GB | 2444406 A | 6/2008 |
| WO | 20090127616 A1 | 10/2009 |

*Primary Examiner* — Stephen W Jackson
*Assistant Examiner* — Christopher Clark
(74) *Attorney, Agent, or Firm* — Coats & Bennett, PLLC

(57) ABSTRACT

A protection circuit protects a receiver from high-energy signals. In one exemplary embodiment, the protection circuit comprises a snapback transistor and a controller. The snapback transistor comprises a gate, a drain connected to an input of the receiver and a source connected to ground. The controller configured to connect the gate to a bias voltage to close the gate in a transmit mode, and to disconnect the gate from the bias voltage to open the gate in a receive mode. The snapback transistor is configured to enter into snapback responsive to a high energy signal at the drain to provide a current path from the drain to the source even when the gate is open and thus protect the receiver.

25 Claims, 3 Drawing Sheets

(56) References Cited

U.S. PATENT DOCUMENTS

| | | | |
|---|---|---|---|
| 2004/0152426 A1* | 8/2004 | Suzuki et al. | 455/83 |
| 2005/0107043 A1* | 5/2005 | Avasarala et al. | 455/78 |
| 2005/0286188 A1* | 12/2005 | Camp et al. | 361/56 |
| 2006/0151836 A1 | 7/2006 | Salcedo et al. | |
| 2007/0004373 A1 | 1/2007 | Kasha et al. | |
| 2007/0236843 A1* | 10/2007 | Demirlioglu et al. | 361/56 |
| 2007/0248069 A1* | 10/2007 | Kim | 370/338 |
| 2007/0297105 A1* | 12/2007 | Brennan et al. | 361/56 |
| 2008/0144242 A1* | 6/2008 | Lai | 361/56 |
| 2009/0264084 A1* | 10/2009 | Olsson et al. | 455/83 |
| 2012/0083224 A1* | 4/2012 | Visser et al. | 455/83 |
| 2012/0295559 A1* | 11/2012 | Kwok et al. | 455/83 |

* cited by examiner

ISOLATION AND PROTECTION CIRCUIT FOR A RECEIVER IN A WIRELESS COMMUNICATION DEVICE

RELATED APPLICATION

This application claims the benefit of U.S. Patent Application Ser. No. 61/485,458 filed on May 12, 2011, which is incorporated herein by reference.

BACKGROUND

Wireless transceivers conserve space within wireless devices by having the transmitter and receiver share an antenna. Generally, the transceiver isolates the transmitter and receiver by including a circulator and/or other switching mechanism between the transmitter and receiver. The switching mechanism connects the transmitter to the antenna while isolating the receiver from the transmitter and antenna when the transceiver transmits signals, and connects the receiver to the antenna while isolating the transmitter from the receiver and antenna when the transceiver receives signals from the antenna.

Because wireless receivers are typically designed to amplify and process very small energy signals, such receivers are susceptible to damage caused by high energy signals. For example, electrostatic discharge (ESD) comprises high energy signals that may damage the receiver. Further, the performance of the receiver may be degraded by undesirable signals that leak into the receiver when the receiver is inactive. Thus, it is desirable to isolate the receiver from damaging high energy signals during all operating modes and from undesirable signals, e.g., a transmission signal reflected by the antenna into the receiver, when the receiver is inactive.

The switching mechanisms in conventional transceivers are generally designed to isolate the disconnected element, e.g., the receiver, from the connected elements, e.g., the transmitter. Further, the transceiver may include filters designed to further suppress signals outside the receiver frequency band. Unfortunately, such isolation and suppression techniques generally do not sufficiently suppress ESD signals. Further, because some communication standards specify overlapping transmit and receive frequency bands (see Table 1), some transmission signals are in the receiver frequency band, and may therefore leak into the receiver when the receiver is inactive. Unwanted RF energy that leaks into the receiver during transmission and/or idle operating modes degrades the receiver performance (sensitivity, noise figure, linearity, etc.).

TABLE 1

| Standard | TX Band (MHz) | RX Band (MHz) |
| --- | --- | --- |
| DCS 1800 | 1710-1785 | 1805-1880 |
| PCS 1900 | 1850-1910 | 1930-1990 |

U.S. Patent Publication 2009/0264084, herein referred to as the '084 publication, discloses one exemplary device and method for addressing these problems. In this application, a pair of diodes connected in anti-parallel are disposed between the switching mechanism and the receiver. When kept at a zero bias, the anti-parallel diodes provide general ESD protection for the receiver. Further, when the receiver is inactive, one of the diodes may be forward biased to produce a low ohmic switch to ground to prevent any signals, including unwanted RF energy, from passing into the receiver. While the solution of the '084 publication addresses the receiver problems resulting from high energy signals and/or undesired leakage signals, the size of the diodes and the parasitics associated with the diodes may be undesirable or unsuitable for some applications.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

A protection circuit for a wireless transceiver comprises a snapback transistor having a drain, a gate, and a source. The drain of the snapback transistor is connected to an input of the receiver and the source is connected to ground. The gate of the transistor is connected via a switch to a bias voltage. The switch is closed in a transmit mode or idle mode to apply the bias voltage to the gate. When the gate is closed, RF signals applied to the drain are shunted to ground. The switch is open in the receive mode, to remove the bias voltage and open the gate so that RF signals are input to the receiver.

The transistor is configured to enter into snapback responsive to a high energy signal at the drain to provide a current path to ground, even when the gate of the transistor is open. As a result, the transistor shunts high energy signals to ground in both the transmit and the receiver modes to protect the receiver from damage.

DETAILED DESCRIPTION

Figure 1:
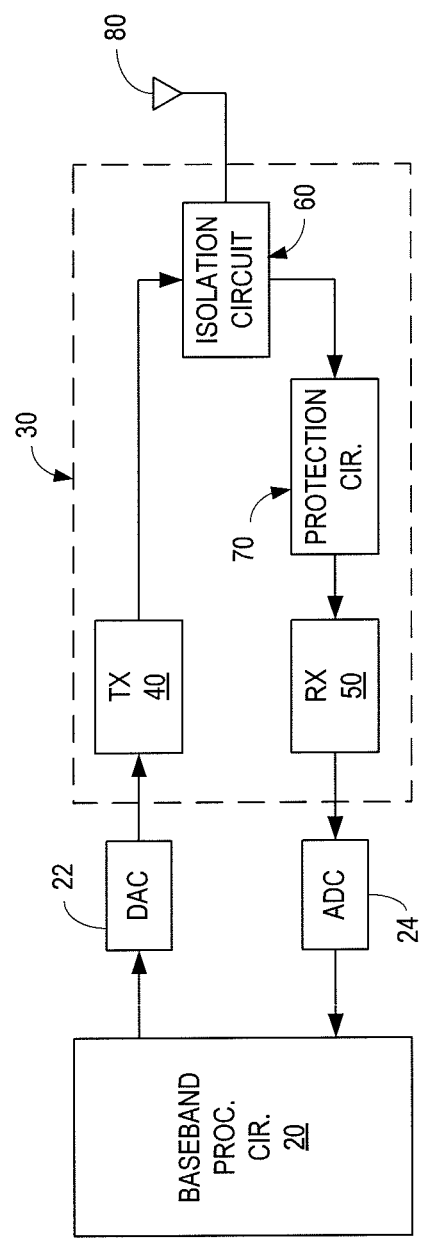
FIG. 1 illustrates a functional block diagram of an exemplary transceiver.

Referring now to the drawings, FIG. 1 illustrates the main functional components of an exemplary wireless communication device 10 according to the present invention. Those skilled in the art will appreciate that some components not essential to understanding of the present invention are omitted for the sake of brevity and clarity. Therefore, various implementations of the present invention may include components in addition to those shown.

The wireless communication device 10 comprises a baseband processing circuit 20 and a transceiver circuit 30. The baseband processing circuit 20 processes signals transmitted and received by the wireless communication device 10. Such processing includes, without limitation, channel coding and digital modulation of signals to be transmitted, as well as demodulation and channel decoding of received signals. The functions of the baseband processing circuit 20 may be implemented by one or more microprocessors, hardware, firmware, or a combination thereof.

The transceiver circuit 30 includes analog components necessary or useful for transmitting and receiving signals over a radio frequency channel. The transceiver circuit 30 comprises a transmitter 40, receiver 50, an isolation circuit 60, a protection circuit 70, and a shared antenna 80. The transmitter 40 and receiver 50 are coupled by the isolation circuit 60 to a shared antenna 80. Although a single antenna 80 is shown, those skilled in the art will appreciate that some embodiments of the invention may have multiple antennas 80. The isolation circuit 60 selectively connects the antenna 80 to the transmitter 40 or the receiver 50 depending on the operating mode as hereinafter described. The isolation circuit 60 may comprise a circulator, switch, and/or other elements that provide the desired connections and isolation. The protection circuit 70 is disposed in the receive signal path between the isolation circuit 60 and the receiver 50. As described in more detail below, the protection circuit 70 functions to protect the receiver 50 from leakage of radio frequency (RF) signal in a transmit mode and to protect the receiver 50 from transient high-energy signals in a receive mode. As one example, the protection circuit 70 may protect the receiver 50 from electrostatic discharge (ESD) signals in the receive mode.

In a transmit mode, digital signals output by the baseband processing circuit 20 for transmission are converted by a digital-to-analog converter (DAC) 22 to analog form. The transmitter 40 upconverts, filters and amplifies the signals. The isolation circuit 60 connects the output of the transmitter 40 to the antenna 80. During transmission, the protection circuit 70 isolates the receiver 50 from high-energy transmit signals that leak through the isolation circuit 60.

In a receive mode, the isolation circuit 60 connects the input of the receiver 50 to the antenna 80. In this mode, the protection circuit 70 passes received signals with energy levels below a trigger threshold to the receiver 50, and shunts signals with energy levels above a trigger threshold to ground to protect the receiver 50 from ESD signals or other transient, high-energy signals. The receiver 50 amplifies and filters the received signals and downconverts the received signals to baseband. The signals output by the receiver 50 are converted by an analog-to-digital converter (ADC) 24 to digital form for input to the processing circuit 20.

Figure 2:
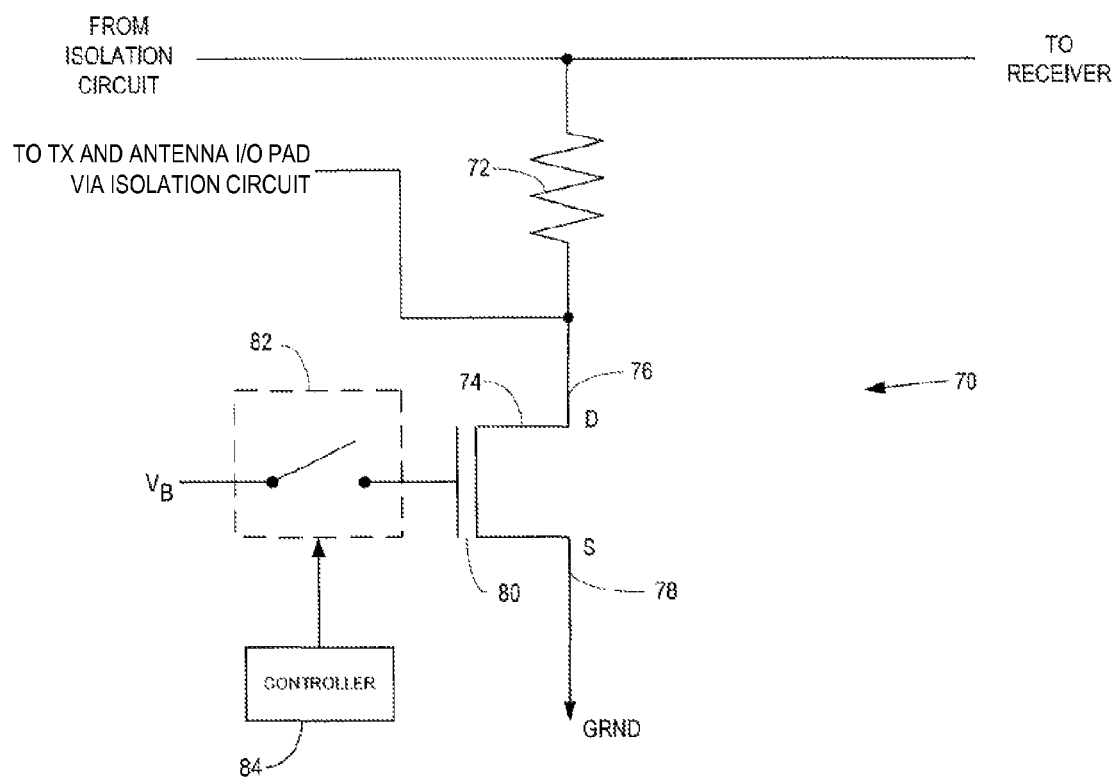
FIG. 2 illustrates a circuit schematic diagram for an exemplary protection circuit for the transceiver of FIG. 1.

FIG. 2 illustrates an exemplary protection circuit 70 according to one embodiment of the invention. The protection circuit 70 comprises an input resistor 72, snapback transistor 74, a switch 82 connected to a bias voltage $V_B$, and a controller 84. The snapback transistor 74 may, for example, comprise a metal-oxide-semiconductor (MOS) transistor. In the case of an nMOS transistor 74, as depicted, the drain 76 of the snapback transistor 74 is coupled via the input resistor 72 to an input of the receiver 50, assuming the low-noise amplifier (LNA) at the receiver input stage is also an nMOS transistor. The drain 76 is also connected to the transmitter 40 and antenna I/O pad, as the transistor 74 offers ESD current a path to ground (as explained below), while the resistor 72 protects the receiver 50. The source 78 of the snapback transistor 74 is coupled to ground. The gate 80 of the snapback transistor 74 is coupled via control switch 82 to a bias voltage $V_B$. The controller 84 is configured to control the state of the control switch 82 depending on the operating mode of the wireless communication device 10.

In a transmit mode, the controller 84 generates a control signal to close the control switch 82 so that the bias voltage $V_B$ is applied to the gate 80. When the bias voltage is present, the gate 80 is closed, rendering the snapback transistor 74 conductive, such that it provides a circuit to ground. In this state (e.g., in transmit or idle mode), high-energy RF signals that leak through the isolation circuit 60, as well as ESD transients, are shunted to ground. In a receive mode, the controller 84 generates a control signal to open the switch 82 so that the gate 80 is no longer biased closed. When the gate 80 is open, the snapback transistor 74 is not conductive, and the receive signal is input to the receiver 50, rather than being shunted to ground.

The protection circuit 70 utilizes the snapback feature of the snapback transistor 74 to protect the receiver 50 from high energy signals in the receive mode. When a sufficiently large signal is applied to the drain 76 of a snapback transistor 74, the transistor 74 is driven into snapback, which causes the gate 80 to capacitively couple to the drain 78 via a parasitic bipolar element (not shown) having a small capacitance, e.g., 10-100 fF. The resulting low impedance current path between the drain and source shunts the large signal present at the drain to ground. More particularly, during snapback operation electron-hole pairs are generated by impact ionizations, causing electrons to flow to the drain 76 and holes to flow to the substrate. When enough holes collect in the substrate, a parasitic bipolar element is activated underneath the MOS structure, where the structure of the parasitic bipolar element is defined by the geometry of the MOS structure. The active parasitic bipolar element enables the drain current to trigger snapback, which enables the snapback transistor 74 to provide a low impedance path between the drain 76 and the source 78.

As a result, when a high energy signal above a trigger threshold is applied to the drain 76 during any transceiver operating modes, the high energy signal pushes the transistor 74 into snapback, enabling the current in the high energy signal to pass harmlessly through the transistor 74 to ground. The transistor 74 may be a pMOS structure, if the receiver 50 LNA input stage is a pMOS device; in this case, the snapback will be to Vdd, not GND.

In addition to protecting the receiver 50 from high-energy signals, the snapback transistor 74 may also be configured to isolate the receiver 50 from unwanted RF energy, e.g., in-band transmission signals, RF signal leakage, etc., when the receiver 50 is inactive. More particularly, controller 84 may generate a control signal to close control switch 82 to selectively bias the gate 80 of the transistor 74, e.g., during transmission and/or idle modes. Exemplary bias voltages $V_B$ comprise CMOS logic high levels typically in the range of 1.8-3.3 V. When a bias voltage $V_B$ is applied to the gate 80 of the transistor 74, the transistor 74 shunts any signals applied to the drain 76 to ground, and therefore, isolates the receiver 50 from unwanted RF signals. By isolating the inactive receiver 50 from all signals, the protection circuit 70 improves receiver performance (sensitivity, noise figure, linearity, etc.).

The protection circuit 70 disclosed herein provides several advantages over diode-based ESD/isolation solutions. First, snapback transistor 74 is significantly smaller than a pair of diodes. For example, a protection circuit 70 comprising the snapback transistor 74 may be 3-10 times smaller than a pair of diodes. Thus, the protection circuit 70 disclosed herein reduces the overall chip area required for the transceiver.

Further, the snapback transistor 74 adds less parasitic capacitance to the receiver input. For example, an exemplary pair of diodes may add 100s of fF of parasitic capacitance to the receiver input, while an exemplary snapback MOS transistor only adds 10-100 fF of parasitic capacitance. Because a larger parasitic capacitance degrades receiver performance, the smaller parasitic capacitance associated with the protection circuit 70 disclosed herein helps reduce the impact the protection circuit 70 has on the receiver performance.

Further still, activating the snapback transistor 74 does not cause any current to flow on the signal line at the receiver input. In contrast, activating one or more diodes connected to a receiver input causes current to flow from the transceiver power supply (not shown). Thus, a transceiver comprising the protection circuit 70 disclosed herein consumes less power than a transceiver that includes a diode-based protection circuit.

Figure 3:
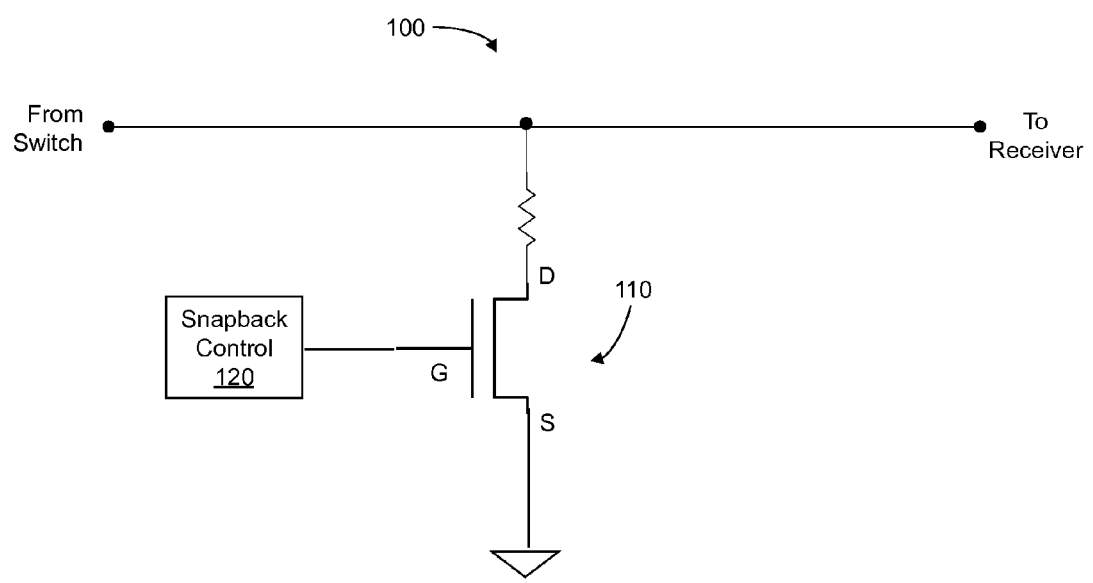
FIG. 3 depicts another embodiment of a circuit diagram for an exemplary protection circuit for the transceiver of FIG. 1.

FIG. 3 depicts a circuit diagram of a protection circuit 100 according to one exemplary embodiment of the invention disclosed herein. The protection circuit 100 comprises a snapback MOS transistor 110 and a snapback control circuit 120. When a sufficiently large signal is applied to the drain of a snapback MOS transistor, the transistor is driven into a snapback mode, which causes the gate to capacitively couple to the drain via a parasitic bipolar element having a small capacitance, e.g., 10-100 fF. The resulting low impedance path between the drain and source allows the large signal present at the drain to shunt to ground. More particularly, during snapback operation, electron-hole pairs are generated by impact ionizations, causing electrons to flow to the drain and holes to flow to the substrate. When enough holes collect in the substrate, a parasitic bipolar element is activated underneath the MOS structure, where the structure of the parasitic bipolar element is defined by the geometry of the MOS structure. The active parasitic bipolar element enables the drain current to enter snapback, which enables the snapback MOS transistor to provide a low impedance path between the drain and the source.

The protection circuit 100 utilizes the snapback feature to protect the receiver 50 from high energy signals by connecting the drain of a snapback MOS transistor 110 between the switch circuit 60 and the receiver 50. As a result, when a high energy signal output by the switch circuit 60 is applied to the drain during any transceiver operating modes, the high energy signal pushes the transistor 110 into snapback, enabling the current in the high energy signal to pass harmlessly through the transistor 110 to ground.

In addition to protecting the receiver 50 from high-energy signals, the snapback MOS transistor 110 may also be configured to isolate the receiver 50 from unwanted RF energy, e.g., in-band transmission signals, RF signal leakage, etc., when the receiver 50 is inactive. More particularly, control circuit 120 may selectively bias the gate of the transistor 110, e.g., during transmission and/or idle modes. In so doing, the control circuit 120 closes the MOS switch to shunt any signals applied to the drain to ground, and therefore, isolates the receiver 50 from unwanted RF signals. By isolating the inactive receiver 50 from all signals, the protection circuit 100 improves receiver performance (sensitivity, noise figure, linearity, etc.).

The snapback control circuit 120 may control the gate voltage using any known control technique. For example, the control circuit 120 may include a switch (not shown) that connects the gate to a bias voltage when the receiver 50 is inactive, e.g., during transmission and/or idle operating modes. Exemplary bias voltages comprise CMOS logic high levels typically in the range of 1.8-3.3 V. By biasing the gate to a suitable bias voltage, the control circuit 120 closes the MOS switch so that all signals applied to the drain, including in-band RF signals, ESD signals, etc., are shunted to ground when the receiver 50 is inactive. When the receiver is active, the control circuit 120 disconnects the gate so that transistor 110 only shunts signals to ground when the transistor 110 enters snapback, e.g., when a high energy signal is applied to the drain. While shown as part of the protection circuit 100, it will be appreciated that the snapback control circuit 120 may be incorporated into a transceiver controller (not shown) configured to control the operation of the transceiver.

The protection circuit 110 disclosed herein provides several advantages over diode-based ESD/isolation solutions. First, snapback MOS transistor 110 is significantly smaller than a pair of diodes. For example, a protection circuit 100 comprising the snapback MOS transistor 110 may be 3-10 times smaller than a pair of diodes. Thus, the protection circuit 100 disclosed herein reduces the overall chip area required for the transceiver.

Further, the snapback MOS transistor 110 adds less parasitic capacitance to the receiver input. For example, an exemplary pair of diodes may add 100s of fF of parasitic capacitance to the receiver input, while an exemplary snapback MOS transistor only adds 10-100 fF of parasitic capacitance. Because a larger parasitic capacitance degrades receiver performance, the smaller parasitic capacitance associated with the protection circuit 100 disclosed herein helps reduce the impact the protection circuit 100 has on the receiver performance.

Further still, activating the snapback MOS transistor 110 does not cause any current to flow on the signal line at the receiver input. Contrastingly, activating one or more diodes connected to a receiver input causes current to flow from the transceiver power supply (not shown). Thus, a transceiver comprising the protection circuit 100 disclosed herein consumes less power than a transceiver that includes a diode-based protection circuit.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless transceiver comprising:
   at least one antenna;
   a transmitter coupled to the antenna for transmitting wireless signals;
   a receiver coupled to the antenna for receiving wireless signals;
   an isolation circuit configured to:
     couple the transmitter to the antenna and isolate the receiver from the antenna in a transmit mode; and
     couple the receiver to the antenna and isolate the transmitter from the antenna in a receive mode;
   a protection circuit configured to protect the receiver from high-energy signals, the protection circuit including a snapback transistor configured as a switch and in series with a resistor, the snapback transistor including a gate, a drain coupled to an input of the receiver and a source coupled to ground, the snapback transistor further configured to:
     enter into snapback mode responsive to a high energy signal at the drain to provide a current path from the drain to the source when the gate is open; and
     recover from the snapback mode when the high energy signal has been shunted to ground and is no longer present; and
   a controller configured to couple the gate to a bias voltage to close the gate in the transmit mode so that a transmit leakage signal from the output of the isolation circuit is shunted to ground, and to decouple the gate from the bias voltage to open the gate in the receive mode.

2. The wireless transceiver of claim 1 wherein the drain of the snapback transistor is coupled to the antenna.

3. The wireless transceiver of claim 2 wherein the resistor is interposed between the snapback transistor drain and the receiver input, the resistor being operative to protect the receiver from the high energy signal when the transistor is in the snapback mode.

4. The wireless transceiver of claim 1 further comprising a switch coupled between the gate of the snapback transistor and a bias voltage, wherein the controller is configured to close the switch to couple the gate to the bias voltage when the receiver is inactive to shunt all signals applied to the drain to the ground, and to open the switch to decouple the gate from the bias voltage during the receive mode.

5. The wireless transceiver of claim 1 wherein the snapback transistor comprises a MOS transistor.

6. The wireless transceiver of claim 1 wherein the snapback transistor is configured to enter the snapback mode when the high energy signal exceeds a predetermined trigger threshold.

7. The wireless transceiver of claim 1 wherein the isolation circuit comprises a switch.

8. The wireless transceiver of claim 1 wherein the isolation circuit comprises a circulator.

9. A protection circuit for a transceiver including a transmitter and a receiver coupled via an isolation circuit to an antenna, said protection circuit comprising:
  a resistor;
  a snapback transistor configured as a switch and coupled in series with the resistor, the snapback transistor including a gate, a drain coupled to an input of the receiver and a source coupled to ground, said snapback transistor being further configured to enter into a snapback mode responsive to a high energy signal at the drain to provide a current path from the drain to the source when the gate is open, and to exit the snapback mode when the high energy signal is removed; and
  a controller configured to couple the gate to a bias voltage to close the gate in a transmit mode so that a transmit leakage signal from the output of the isolation circuit is shunted to ground, and to decouple the gate from the bias voltage to open the gate in a receive mode.

10. The protection circuit of claim 9 further comprising a switch coupled between the gate of the snapback transistor and a bias voltage, wherein the controller is configured to close the switch to couple the gate to the bias voltage when the receiver is inactive to shunt all signals applied to the drain to the ground, and to open the switch to decouple the gate from the bias voltage during the receive mode.

11. The protection circuit of claim 9 wherein the snapback transistor comprises a MOS transistor.

12. The protection circuit of claim 9 wherein the snapback transistor is further configured to enter the snapback mode when the high energy signal exceeds a predetermined trigger threshold.

13. The protection circuit of claim 9, wherein the snapback transistor is further configured to enter into the snapback mode responsive to the high energy signal at the drain during the receive mode to provide the current path for the high energy signal while the gate is open.

14. The protection circuit of claim 9, wherein the snapback transistor is further configured to provide the current path for the leakage signal when the gate is closed during the transmit mode.

15. The protection circuit of claim 14, wherein the snapback transistor is further configured to provide the current path for the high energy signals when the gate is closed during the idle mode.

16. The protection circuit of claim 9, wherein the high-energy signal is an electro-static discharge (ESD) signal.

17. The wireless transceiver of claim 1, wherein the protection circuit is further configured to protect the receiver from the high energy signals during the receive mode; and
  wherein the snapback transistor is further configured to provide the current path for the high energy signals when the gate is open during the receive mode.

18. The wireless transceiver of claim 1, wherein the protection circuit is further configured to protect the receiver from a leakage signal from the transmitter during the transmit mode; and
  wherein the snapback transistor is further configured to provide the current path for the leakage signal when the gate is closed during the transmit mode.

19. The wireless transceiver of claim 1, wherein the protection circuit is further configured to protect the receiver from the high energy signals in an idle mode and the transmit mode; and
  wherein the snapback transistor is further configured to provide the current path for the high energy signals when the gate is closed during the idle mode and the transmit mode.

20. The wireless transceiver of claim 1, wherein the high-energy signal is an electro-static discharge (ESD) signal.

21. The wireless transceiver of claim 1, wherein the protection circuit is further configured to protect the receiver from:
  the high energy signals during the receive mode,
  the high energy signals associated with the antenna in an idle mode and the transmit mode; and
  the transmit leakage signal during the transmit mode; and
wherein the snapback transistor is further configured to provide the current path for:
  the high energy signals when the gate is open during the receive mode;
  the high energy signals associated with the antenna when the gate is closed during the idle mode and the transmit mode; and
  the transmit leakage signal when the gate is closed during the transmit mode.

22. The wireless transceiver of claim 1, wherein the transmit leakage signal is a leakage of a radio frequency (RF) signal during the transmit mode through the isolation circuit.

23. The wireless transceiver of claim 1, wherein the protection circuit is further configured to include the drain of the snapback transistor being coupled to an output of the isolation circuit corresponding to the receiver.

24. The protection circuit of claim 9, wherein the transmit leakage signal is a leakage of a radio frequency (RF) signal during the transmit mode through the isolation circuit.

25. The protection circuit of claim 9, wherein the protection circuit is further configured to include the drain of the snapback transistor being coupled to an output of the isolation circuit corresponding to the receiver.

* * * * *